Oct. 22, 1929. E. BOCCHINO Re. 17,469

SAFETY DEVICE FOR FIRE ESCAPES

Original Filed Nov. 24, 1926

INVENTOR
Ernest Bocchino
BY
Warren E. Willis
ATTORNEY

Reissued Oct. 22, 1929

Re. 17,469

UNITED STATES PATENT OFFICE

ERNEST BOCCHINO, OF NEWARK, NEW JERSEY, ASSIGNOR TO SAFETY DEVICE FIRE ESCAPE COMPANY, INC., OF NEWARK, NEW JERSEY, A CORPORATION OF NEW JERSEY

SAFETY DEVICE FOR FIRE ESCAPES

Original No. 1,641,798, dated September 6, 1927, Serial No. 150,454, filed November 24, 1926. Application for reissue filed July 11, 1929. Serial No. 377,544.

This invention relates to fire escapes as applied to dwelling houses, office buildings and other plurally storied, peopled structures and which are subject to fire hazards, the device being a safety device for fire escape.

Such fire escapes usually take the shape of platforms accessible from the building through windows or equivalent openings and are provided with guard rails at their outer edges.

Leading from the uppermost platform to the next below are steps or stair-ways and with the lowermost is associated some type of ladder, pivoted to swing or mounted to slide up and down as may be preferred.

In order to prevent the misuse of such ladders in obtaining unwarranted access to the building it is customary to retain them normally at a considerable height from the ground, such raised position also affording unobstructed passage below the ladder and free use of the surface below.

This implies that the ladder, when in a raised position, must be securely supported to prevent accident and on the other hand it is clearly evident that the ladder must be so mounted as to descend and become instantly available when its use is required.

It is therefore an object of this invention to provide a ladder with a counter-balance nearly equal to the weight of the ladder and means to carry the excess weight of the ladder when raised, such means being disengageable at will.

It is a further feature to provide a catch cooperative between the ladder and platform for supporting the excess weight of the ladder, the catch being easily displaceable by pressing the ladder sidewise.

Another aim is in the provision of one or more guides for the counterweight whereby it is positively directed to its seat upon a rigid catcher in case the flexible connection between the weight and ladder should break.

These and other important objects are accomplished by the novel and practical construction and arrangement of parts hereinafter described and shown in the accompanying drawing in which:—

Figure 1:
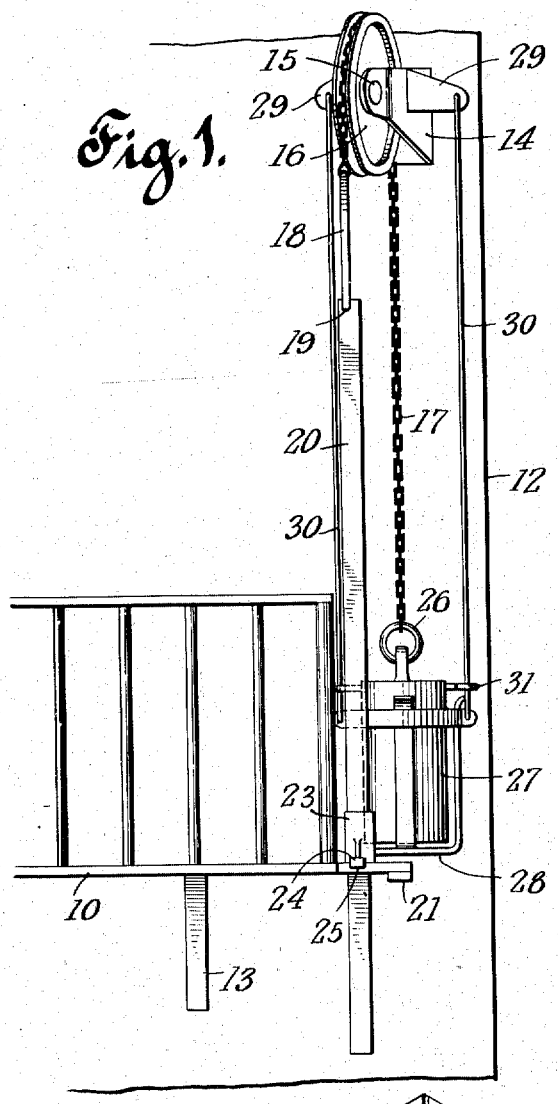
Figure 1 is a side elevational view of a conventional fire escape landing including a ladder supported by an embodiment of the invention.

In the drawing the numeral 10 generally designates a conventional fire escape platform having an open end 11, the platform being fixed to the wall 12 of a building by supporting brackets 13.

Fixed above the fire escape, is a bracket 14 carrying a shaft 15 on which is rotatably mounted a sheave or grooved pulley 16 over which is trained a cable 17 secured at one end to a U-shaped support 18 provided with hooks 19 engageable with the upper ends of a ladder 20.

The ladder extends downwardly past the opening 11 and is guided by a transverse bar 21 fixed to the platform 10.

Fixed preferably on one of the sides of the ladder as by set screws 22, is a channel-shaped support 23 having a projecting catch or clip 24 provided with a chamfered surface or cam face 25 engageable with some fixed part of the platform, as one of the flooring members 10, thus normally supporting the ladder 20.

The free end of the cable 17 is provided with a ring 26 fixed to a weight 27 normally resting on a support which may preferably be in the form of a catcher 28 secured to the fire escape 10 or the adjacent wall 12 or otherwise.

Extending from the sides of the bracket 14 is a pair of lugs 29 to which are fixed one or more rods or guide bars 30 engageable with projections 31 oppositely disposed on the weight 27 the free ends of the vertical guide elements 30 being attached to the bracket 28, so that the weight may be easily guided thereon when moved in a vertical plane.

The support 23 may be adjusted so that when the weight 27 is resting on the catcher 28, the catch 24 will just engage and rest over the frame of the platform.

Figure 2:
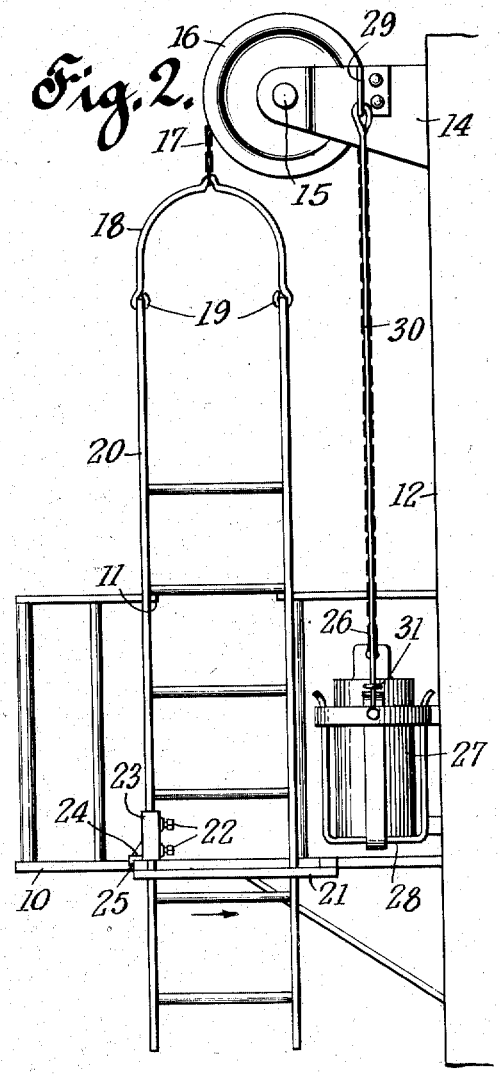
Figure 2 is a front elevational view of the same.
Figure 3:
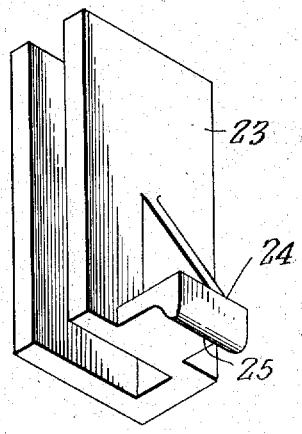
Figure 3 is a perspective view showing an adjustable clip in detail.
Figure 4:
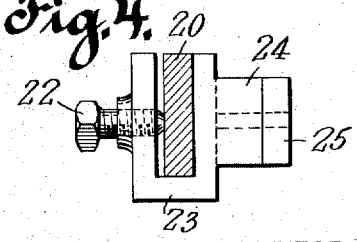
Figure 4 is a transverse sectional view of a ladder side having an attached clip.

It is obvious that when it becomes necessary to use the ladder, it is merely required to move the same in the direction of the arrow (Figure 2) causing the catch 24 to clear the platform.

The ladder may then be pulled downwardly against the weight 27, and a person may use it in making exit from the platform.

From the foregoing, it may be seen that a safety device for ladders has been disclosed, in which an easily disengageable catch supports the surplus weight of a counterbalanced ladder.

It will be clearly apparent that the form of the guide elements may be varied in number, cross section, length and manner of attachment without affecting their function in any material manner which is to surely guide the weight to its seat upon a catcher, which may or may not be provided with upstanding side members as preferred.

It is further to be noted that the clips may be reversed in position and carried by the platform to engage the ladder, the operation and function being the same and no exercise of invention being displayed in such rearrangement of parts.

Therefore as changes of construction could be made within the scope of the invention, it is intended that all matter contained in the foregoing description or shown in the accompanying drawing shall be interpreted as illustrative and not in a limiting sense.

Having thus described my invention, what I claim as new and desire to secure by Letters Patent, is:—

1. In combination with a fire escape platform and a ladder movable vertically at one end of the platform, of means to guide said ladder, means for counterbalancing the greater portion of the weight of said ladder, and a catch adjustably carried by said ladder to support the excess weight thereof, said catch normally engaging one of the platform elements to be displaced therefrom upon exerting lateral pressure on said ladder.

2. In combination with a fire escape platform and a ladder movable vertically at one end of the platform, of means to guide said ladder, an arcuate loop at the top of said ladder, a sheave wheel, a cable trained over said wheel one end of said cable being attached to said loop, a counter-weight attached to the other end of the cable, a fixed bracket to receive said counter-weight, and a catch adjustably fixed on said ladder to engage said platform, said catch being disengaged from said platform by lateral pressure.

3. In combination with a fire escape platform and a ladder movable vertically at one end of the platform, a guide on said platfrom for said ladder, a catcher supported adjacent said platform, a weight receivable in said catcher, a grooved wheel fixed above said platform, a cable trained over said wheel connecting said ladder and weight, means for guiding said weight relative to the catcher and a catch adjustably fixed on said ladder to engage said platform, said catch being disengaged from said platform by shifting the ladder laterally.

4. A fire escape ladder adapted for vertical movement comprising in combination with a fire escape platform, a pair of sides connected by rungs, a counter-weight to nearly balance said ladder, a catcher to normally contain said weight, a cable attached to said ladder and weight at its respective ends, a bracket fixed above the fire escape ladder, lateral arms on said bracket, a sheave revoluble in said bracket over which said cable is trained, rods fixed to said catcher and arms, means carried by said weight to engage said rods to be guided thereby and a catch controlling the descent of said ladder, said catch being displaceable from the platform upon shifting the ladder laterally.

5. In combination with a fire escape platform and a ladder movable vertically relative to the platform, of a bar enclosing and guiding said ladder, means for counterbalancing the greater portion of the weight of said ladder, and a catch intermediate the length of the ladder to support the excess weight thereof, said catch normally engaging one of the platform elements to be displaced theerfrom upon exerting lateral pressure on said ladder.

6. In combination with a fire escape platform and a ladder movable vertically relative to the platform, of a single means fixed to extend in front of and to guide said ladder, a counter-weight, a sheave wheel, a cable trained over said wheel and attached at its end respectively to said ladder and counterweight, a catcher fixed to a support, adjacent and independent of said platform to receive said counter-weight, means for guiding the counter-weight thereon, and means to normally retain said ladder in a raised position, said means being displaceable by lateral pressure applied to the ladder.

7. In combination with a fire escape platform and a ladder movable vertically relative to the platform, a guide on said platform for said ladder, said guide retaining the ladder against the platform, and permitting it to move limitedly sidewise, a counterbalance for the ladder, an independent rigid support to receive said counterbalance, means for positively guiding said counterbalance thereon, and a catch intervening the platform and ladder disengageable by shifting the ladder laterally.

8. In combination with a fire escape platform having a vertically slidable ladder provided with a partial counterbalance, of means to engage said ladder intermediate its length to sustain its excess weight, said means becoming disengaged by moving the ladder sidewise.

9. In combination with a fire escape platform having a vertically slidable ladder provided with a partial counterbalance, of a single bar extending across the front of the ladder to guide the same as it is moved up and down, said bar permitting limited edgewise movement of the ladder displaceable means to sustain the excess weight of the ladder, said means being engaged midway the length thereof, a rigid catcher to receive the counterbalance, and means to guide the counterbalance while raising and lowering.

10. In combination with a fire escape platform having an enclosing fence provided with an opening and a ladder slidable in a vertical plane past the opening at one end of the fence, said ladder being provided with a partial weight balancing means, of means for guiding the ladder, unitary means to sustain the excess weight of said ladder whereby it is retained in a normally raised position at the fence opening, said means being releasable upon moving the ladder laterally, means to positively guide said weight balancing means in a vertical path, and means independent of said platform to catch said weight balancing means to limit its descent.

In testimony whereof I affix my signature.

ERNEST BOCCHINO.